United States Patent

[11] 3,572,783

| [72] | Inventor | Harry L. Sosalla<br>Sac City, Iowa |
|---|---|---|
| [21] | Appl. No. | 766,364 |
| [22] | Filed | Sept. 18, 1968 |
| [45] | Patented | Mar. 30, 1971 |
| [73] | Assignee | Noble Manufacturing Company<br>Sac City, Iowa<br>Continuation of application Ser. No.<br>525,727, Feb. 7, 1966, now abandoned. |

[54] CONNECTOR
10 Claims, 4 Drawing Figs.

[52] U.S. Cl. ................................................ 287/99,
172/626
[51] Int. Cl. ...................................................... F16c 11/00
[50] Field of Search........................................... 287/99, 92,
93, 96, 101, 100, 14, 189.36 (F), 3; 172/626, 627;
52/633, 634

[56] References Cited
UNITED STATES PATENTS

| 1,629,529 | 5/1927 | Reimer et al. | 280/491X |
| 1,860,494 | 5/1932 | Clark | 287/14 |
| 2,319,755 | 5/1943 | Strandlund | 287/96X |
| 2,554,292 | 5/1951 | Brown | 287/14X |
| 2,735,251 | 2/1956 | Dlugosch | 287/96X |
| 3,003,600 | 10/1961 | MacKenzie | 287/189.36F |

FOREIGN PATENTS

| 1,196,175 | 5/1959 | France | 16/166 |
| 1,319,772 | 1/1963 | France | 52/633 |

*Primary Examiner*—Reinaldo P. Machado
*Assistant Examiner*—Andrew V. Kundrat
*Attorney*—Parker, Carter & Markey ABSTRACT: A connector for joining elongated members such as harrow crossbars which connector may be selectively adjusted to function as a rigid connector, a hinge connector or a hinge connector permitting limited vertical movement of the harrow crossbars relative to each other. The connector includes a U-shaped member connected to an end of each crossbar with one U-shaped member adapted to telescope in the other. Rectilinearly elongated and circular apertures are formed in the arms of the U-shaped members with similar openings in the arms of each U-shaped member being aligned. When the U-shaped members of adjacent crossbars telescope, similar openings in the arms of each member will be in alignment. Pivot pins may be installed through either the rectilinearly elongated or circular apertures or both to selectively connect the crossbars.

PATENTED MAR 30 1971 3,572,783
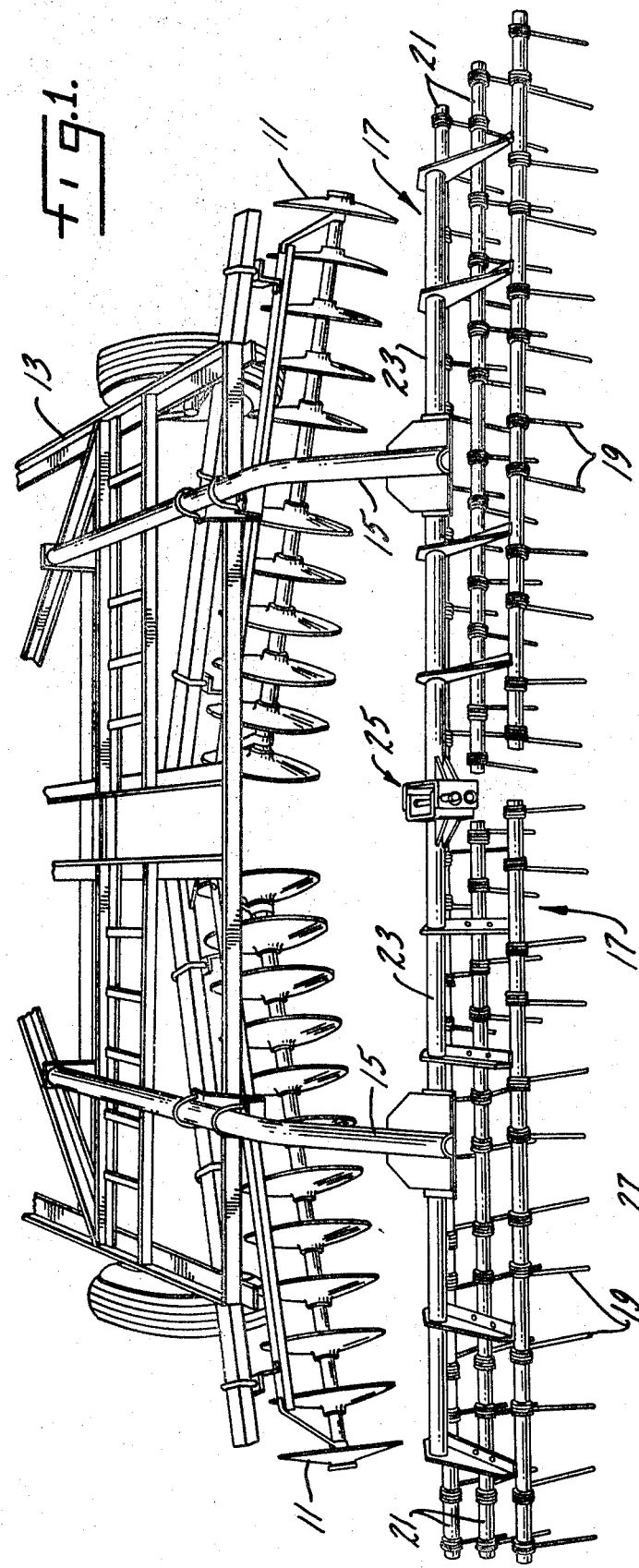
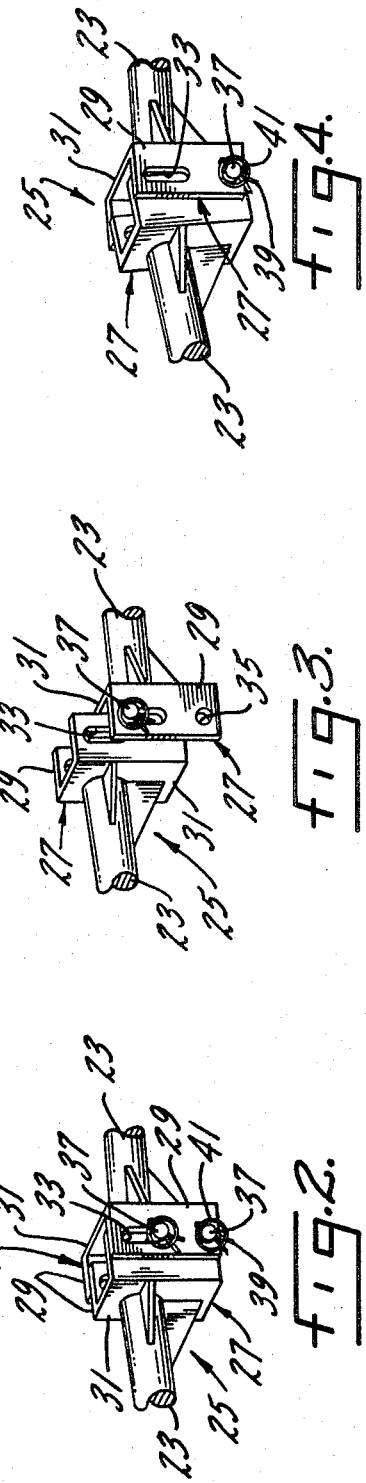
INVENTOR.
Harry L. Sosalla,
BY Parker & Carter
Attorneys.

3,572,783

CONNECTOR

This is a continuation of copending application Ser. No. 525,727, filed Feb. 7, 1966, and now abandoned.

This invention is concerned with a connector for joining elongated members in an end to end relationship and more particularly with such a connector that can be adjusted to vary the nature of the connection between the elongated members.

An object of this invention is an end to end connector for elongated members that can function either as a rigid connector, as a hinge connector, or as a hinge connector permitting limited movement of the elongated members generally at right angles to the lengths of said elongated members.

Another object is a connector for joining mulcher sections that can be adjusted to rigidly connect the sections, to hingedly connect the sections or to hingedly connect the sections in such a manner as to permit limited vertical movement of one section relative to the other section.

Another object is a connector of the above-described type which can be adjusted between the various operating positions simply by the removal or insertion of one or more pivot pins.

Other objects will be found in the following specification, claims and drawings.

The invention is illustrated more or less diagrammatically in the following drawings wherein:

FIG. 1 is a perspective view showing the connector installed on a farm implement of the type commonly known as disc mulcher;

FIG. 2 is an enlarged partial view of FIG. 1 showing the connector adjusted to rigidly join adjacent mulcher sections;

FIG. 3 is a view similar to FIG. 2 and showing the connector adjusted to join adjacent mulcher sections in a hinged relationship which permits limited vertical movement relative to each other; and FIG. 4 is a view similar to FIG. 2 and showing the connector adjusted to join adjacent mulcher sections in hinged relationship.

In the drawings, the numeral 11 indicates disc harrows mounted on a wheeled frame 13. Rearwardly extending carrier arms 15 are mounted on the frame to support the mulcher sections 17. Each mulcher section includes coil teeth 19 mounted on tooth bars 21 which in turn are fastened to a crossbar 23 which attaches to the rearward end of a carrier arm 15. Crossbars of adjacent mulcher sections are joined by connectors 25.

A connector 25 is made up of U-shaped elements 27 attached to the ends of the adjacent crossbars 23 with the spaced arms 29 of the U-shaped elements formed from plates which are generally flat and rectangular. These plates connect to a flat plate forming the base 31 of the U. As can be seen in the drawings, the U-shaped elements 27 of adjacent crossbars are formed so that the U-shaped element of one crossbar can be telescoped inside the U-shaped element of the other crossbar to position the arms 29 of one U-shaped element in side by side relationship with the arms of the other U-shaped element.

Each arm 29 of a U-shaped element 27 is formed with an elongated aperture 33 and a circular aperture 35 extending therethrough with similar apertures in the arms formed in alignment. The longitudinal axes of the elongated apertures extend generally at right angles to the longitudinal axes or lengths of the crossbars 23 and are aligned with the diameters of the circular apertures. When the U-shaped elements of adjacent crossbars are telescoped, similar apertures of the arms of the elements can be aligned to receive connecting means. Pivot pins 37 are provided to extend through the aligned apertures and are of sufficient length to extend beyond the arms of the larger U-shaped member. One end of each pivot pin may be headed to position the pins in the apertures but this is now shown. Cotter keys 39 are provided to lock the pins in place and rings 41 are attached to the cotter keys to permit easy removal thereof.

The use, operation and function of the invention are as follows:

The connector 25 of this invention is intended for use in joining crossbars 23 of adjacent mulcher sections 17 which are mounted on wheeled disc harrows, such as the type shown in FIG. 1. The purpose of such a connector is to permit the use of fewer and lighter support arms 15 than would be required if the adjacent mulcher sections were not connected. However, in some instances it is not desirable to have a rigid connection between the adjacent mulcher sections. This invention is intended to permit easy conversion from a rigid connection between the mulcher sections to a hinge connection or to a hinge connection in which relative vertical movement of adjacent mulcher sections is permitted.

The connector 25, which performs these various functions, consists of interengaging U-shaped elements 27 each having aligned elongated apertures 33 and circular apertures 35 formed in the arms of the U-shaped elements. When pivot pins 37 are installed so as to extend through both the elongated apertures and the circular apertures, as shown in FIG. 2, the connector rigidly joins the crossbars 23 of the adjacent mulcher sections 17. If it is desired that the adjacent mulcher sections be permitted to move in a hinged relationship to each other, as is shown in FIG. 4, a pivot pin is inserted to extend through the circular apertures 35 and the pivot pin is removed from the elongated apertures 33. With a pivot pin extending only through the circular apertures 35, the U-shaped elements will pivot about the pin 37 allowing pivoting or hinged movement of the adjacent mulcher sections. When it is desirable to permit relative vertical movement of the adjacent mulcher sections as well as pivoting or hinged movement, the pivot pin 37 extending through the circular apertures 35 is removed and a pivot pin is installed to extend through the elongated apertures 33. With this placement of the pivot pin as shown in FIG. 3, the U-shaped elements of the connector will be permitted to move vertically relative to each other and to pivot about the pivot pin thus permitting limited vertical relative movement of the adjacent mulcher sections as well as pivoting action.

Whereas this invention has been shown and described as applied to adjacent mulcher sections mounted on a wheeled disc harrow, it should be apparent that it can have many other applications in which adjacent elongated members such as the crossbars 23 are to be connected together, therefore, the scope of the invention should be limited only by the hereinafter appended claims.

I claim:

1. A connector for releasably and adjustably joining adjacent elongated members in an end-to-end relationship which connector may be selectively adjusted to function as a rigid connector, a hinge connector or a hinge connector permitting limited movement of the elongated members generally at right angles to the length of said elongated members including:

a pair of spaced plates formed at the adjacent end of at least one of said elongated members as the arms of a U-shaped element;

at least one generally platelike portion formed at the adjacent end of the other elongated member with said generally platelike portions of adjacent elongated members adapted to be positioned in side by side overlapping relationship;

a pivotal aperture and a generally rectilinear elongated aperture formed through each of said plates with the apertures of one plate being alignable with similar apertures of the other plates when the plates are positioned in side by side overlapping relationship;

each of said rectilinearly elongated apertures having a longitudinal axis extending generally at right angles to the longitudinal axis of the elongated member; and a pair of pivot pins with at least one pivot pin extending through one set of aligned apertures at any one time to releasably hold the plates together, with said one pivot pin and with said one set of aligned apertures cooperating to form a pivotal joint between said adjacent elongated members.

2. The structure of claim 1 further characterized in that a pair of spaced plates are formed at the adjacent end of each elongated member as the arms of a U-shaped element with the generally platelike arms of the U-shaped elements of adjacent elongated members adapted to be positioned in side-by-side overlapping relationship, and the similar apertures of the arms being alignable to receive at least one of the two pivot pins at any one time to releasably hold the elongated members together.

3. The structure of claim 1 further characterized in that in each plate the longitudinal axis of said rectilinearly elongated aperture is aligned with the center of the pivotal aperture.

4. The structure of claim 2 further characterized in that said U-shaped element of one adjacent elongated member telescopes within the U-shaped element of the other adjacent elongated member.

5. The structure of claim 1 further characterized in that one of said pivot pins is positioned to extend through said rectilinearly elongated apertures and the other pivot pin is positioned to extend through said pivotal apertures to rigidly connect the elongated members.

6. The structure of claim 1 further characterized in that only one of said pivot pins is positioned to extend only through the pivotal apertures to pivotally connect the elongated members.

7. The structure of claim 1 further characterized in that only one of said pivot pins is positioned to extend only through said rectilinearly elongated apertures with sufficient clearance to permit the pivot pin to move along the length of the rectilinearly elongated apertures to pivotally connect the elongated members and to allow limited relative movement of the members generally at right angles to the lengths of the elongated members.

8. The structure of claim 2 further characterized in that one of said pivot pins is positioned to extend through the aligned rectilinearly elongated apertures and the other of the pivot pins is positioned to extend through the aligned pivotal apertures of the arms of the U-shaped elements to rigidly connect the elongated members.

9. The structure of claim 2 further characterized in that only one of said pivot pins is positioned to extend only through the aligned pivotal apertures of the arms of the U-shaped elements to pivotally connect the elongated members.

10. The structure of claim 2 further characterized in that only one of said pivot pins is positioned to extend only through the aligned rectilinearly elongated apertures of the arms of the U-shaped members with sufficient clearance to permit the pivot pin to move along the length of the rectilinearly elongated apertures to pivotally connect the elongated members and to allow limited relative movement of the members generally at right angles to the lengths of the elongated members.